(12) United States Patent
Tatsumi

(10) Patent No.: US 10,225,427 B2
(45) Date of Patent: Mar. 5, 2019

(54) IMAGE READING DEVICE

(71) Applicant: KYOCERA DOCUMENT SOLUTIONS INC., Osaka (JP)

(72) Inventor: Eiji Tatsumi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/749,811

(22) PCT Filed: Oct. 25, 2016

(86) PCT No.: PCT/JP2016/081645
§ 371 (c)(1),
(2) Date: Feb. 2, 2018

(87) PCT Pub. No.: WO2017/073583
PCT Pub. Date: May 4, 2017

(65) Prior Publication Data
US 2018/0227455 A1    Aug. 9, 2018

(30) Foreign Application Priority Data

Oct. 30, 2015 (JP) .................. 2015-214858

(51) Int. Cl.
*H04N 1/04* (2006.01)
*H04N 1/00* (2006.01)
(Continued)

(52) U.S. Cl.
CPC ......... *H04N 1/00976* (2013.01); *G03B 27/50* (2013.01); *G03G 15/04* (2013.01); *H04N 1/00557* (2013.01); *H04N 1/04* (2013.01); *H04N 1/0473* (2013.01); *H04N 1/1065* (2013.01)

(58) Field of Classification Search
CPC .. H04N 1/00976; H04N 1/00557; H04N 1/04; H04N 1/0473; H04N 1/1065; G03B 27/50; G03G 15/04
USPC ..... 358/497, 494; 250/208.1, 239, 234–236; 174/117 FF, 99 R
See application file for complete search history.

(56) References Cited

U.S. PATENT DOCUMENTS

| 8,724,181 B2* | 5/2014 | Fujiwara | H04N 1/0083 358/474 |
| 9,781,284 B2* | 10/2017 | Hozono | H04N 1/0083 |

(Continued)

FOREIGN PATENT DOCUMENTS

| JP | 2004-273435 | 9/2004 |
| JP | 2009-244470 | 10/2009 |

OTHER PUBLICATIONS

International Search Report (ISR) dated Dec. 20, 2016 in International (PCT) Application No. PCT/JP2016/081645.

*Primary Examiner* — Cheukfan Lee
(74) *Attorney, Agent, or Firm* — Wenderoth, Lind & Ponack, L.L.P.

(57) ABSTRACT

An image reading device includes an angle restriction part 212a that restricts an inclination angle with respect to a document table glass (203) when viewed from a sub-scanning direction of a flat cable (214) such that a contact portion is biased to one side of the flat cable (214) in a main scanning direction when an upper surface part of the flat cable (214) contacts with the document table glass (203) with movement of an image reading unit (210).

9 Claims, 14 Drawing Sheets

(51) Int. Cl.
*G03G 15/04* (2006.01)
*G03B 27/50* (2006.01)
*H04N 1/047* (2006.01)
*H04N 1/10* (2006.01)

(56) References Cited

U.S. PATENT DOCUMENTS

| | | | |
|---|---|---|---|
| 9,843,697 B2* | 12/2017 | Takahashi | H04N 1/02835 |
| 10,027,835 B2* | 7/2018 | Ishida | H04N 1/00018 |
| 10,038,811 B2* | 7/2018 | Tanaka | H04N 1/1043 |
| 2004/0173374 A1* | 9/2004 | Chen | H02G 11/006 |
| | | | 174/117 FF |
| 2009/0244655 A1 | 10/2009 | Mukai et al. | |
| 2018/0183958 A1* | 6/2018 | Ishii | H04N 1/00708 |

* cited by examiner

Fig.5
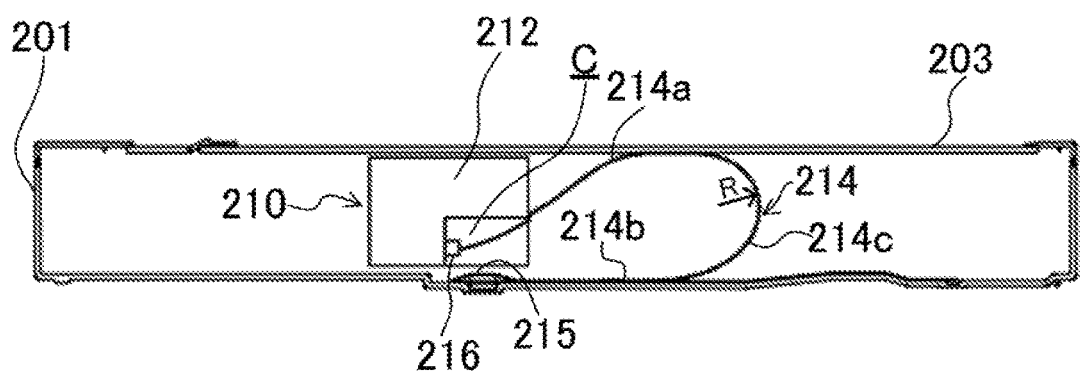
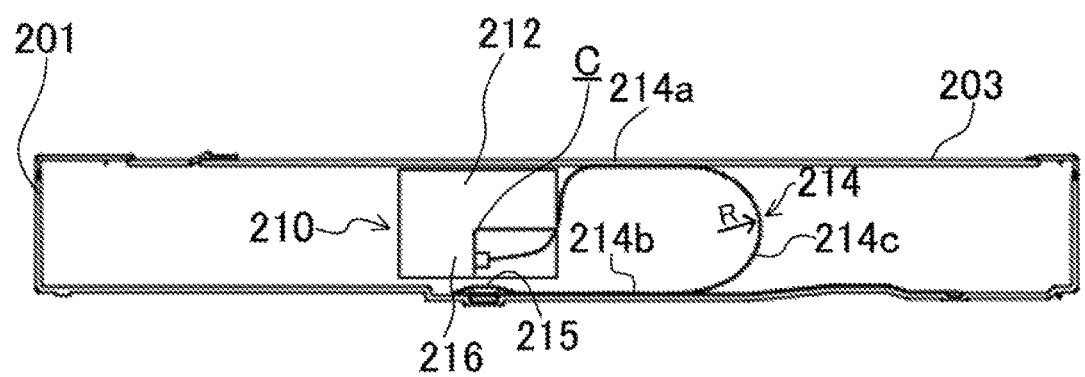

Other side     Main scanning direction     One side
Front side     Front and rear direction     Rear side

IMAGE READING DEVICE

TECHNICAL FIELD

The present invention relates to an image reading device.

BACKGROUND ART

In the related art, there has been known an image reading device including a housing mounted at an upper surface thereof with a document table glass and an image reading unit configured to be received in the housing to be movable in a sub-scanning direction perpendicular to a main scanning direction. The aforementioned image reading unit has a light source, which emits light toward the document table glass, and the like. The image reading unit is connected to a fixed board, which is fixed to a bottom wall of the housing, via a flat cable. One end part of the flat cable is connected to the image reading unit and the other end part thereof is connected to the aforementioned fixed board. The flat cable includes a flexible member and forms an U shape having an upper sidewall part, a lower sidewall part, and a curved part that connects the both sidewall parts to each other when viewed from the main scanning direction. With the movement of the image reading unit, the flat cable is deformed while increasing/decreasing a curvature radius of the curved part.

In this type of image reading unit, when the curvature radius of the curved part of the flat cable becomes equal to or more than a predetermined value during the movement of the image reading unit, an upper surface of the upper wall part of the flat cable contacts with the document table glass. As a consequence, frictional resistance or electrostatic attraction force occurs between the flat cable and the document table glass. When the electrostatic attraction force occurs, the cable may operate to repeat a close contact state and a separation state with respect to the glass surface. Due to the frictional resistance or the electrostatic attraction force, there is a problem that a movement speed of the image reading unit is changed.

In order to solve such a problem, various technologies have been proposed up to now. For example, in an image reading unit disclosed in Patent Literature 1, a weight is mounted at a lower surface of the upper wall part of the flat cable. In this way, the upper wall part of the flat cable is bent downward by the load of the weight, so that a contact between the flat cable and the document table glass is avoided.

CITATION LIST

Patent Literature

Patent Literature 1: Japanese Unexamined Patent Application Publication No. 2004-273435

SUMMARY OF INVENTION

Technical Problem

However, in the image reading unit disclosed in the aforementioned Patent Literature 1, since it is necessary to perform processing for mounting a weight at the flat cable, there is a problem that processing cost increases. Furthermore, since the curvature radius of the curved part of the flat cable is changed with the movement of the image reading unit, when the change is repeated, the weight may be detached from the flat cable. When the weight is detached, since the flat cable contacts with the document table glass, it is not possible to suppress a speed variation of the image reading unit due to frictional resistance or electrostatic attraction force of the both.

The present invention has been made in view of such problems, and an object of the present invention is to reliably suppress a speed variation of an image reading unit due to frictional resistance or electrostatic attraction force between a flat cable and a document table glass by using a simple configuration.

Solution to Problem

An image reading unit according to the present invention includes a housing mounted at an upper surface thereof with a document table glass, an image reading unit that emits light toward the document table glass while reciprocally moving in a sub-scanning direction perpendicular to a main scanning direction between a bottom wall part of the housing and the document table glass, and a flat cable having one end part connected to the image reading unit and the other end part fixed to the bottom wall part of the housing, and arranged in an U shape consisting of an upper sidewall part, a lower sidewall part and a curved part for connecting the both sidewall parts when viewed from the main scanning direction.

The aforementioned image reading device includes an angle restriction part that restricts an inclination angle of the flat cable with respect to the aforementioned document table glass when viewed from the sub-scanning direction of the flat cable such that when a contact portion between an upper surface part of the flat cable and the document table glass is generated with the movement of the image reading unit, the contact portion is biased to one side of the flat cable in the main scanning direction.

Advantageous Effects of Invention

According to the present invention, it is possible to reliably suppress a speed variation of an image reading unit due to frictional resistance or electrostatic attraction force between a flat cable and a document table glass by using a simple configuration.

BRIEF DESCRIPTION OF DRAWINGS

FIG. 5 is a schematic view illustrating an aspect of a change in the shape of a flat cable with the movement of an image reading unit.

DESCRIPTION OF EMBODIMENTS

Embodiment 1

Hereinafter, embodiments of the present invention will be described in detail on the basis of the drawings. It is noted that the present invention is not limited to the following embodiments.

Figure 1:
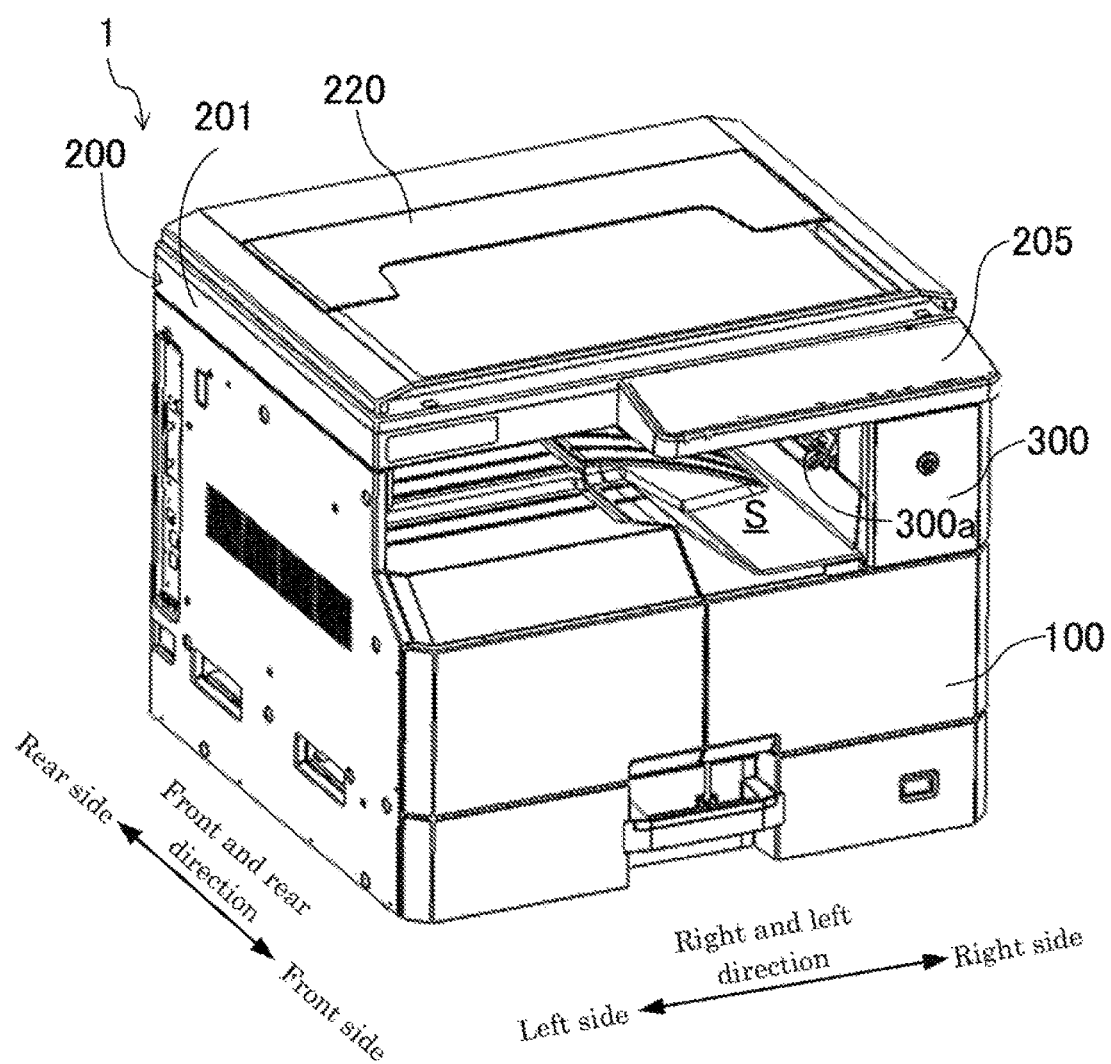
FIG. 1 is a perspective view illustrating an image forming apparatus including an image reading device in an embodiment.

FIG. 1 illustrates an image forming apparatus 1 including an image reading device 200 of the present embodiment. The image forming apparatus 1 is so-called an in-body sheet discharge type copy machine and has an image forming apparatus body 100, the image reading device 200, and a support casing 300. The image reading device 200 reads a document image to acquire image data thereof. In the image forming apparatus body 100, the image data acquired by the image reading device 200 is printed on a sheet P. The image reading device 200 is supported to an upper side of the image forming apparatus body 100 via the support casing 300. Between the image forming apparatus body 100 and the image reading device 200, a sheet discharge space S is formed. The image reading device 200 is provided at a lateral side thereof with an operation panel 205 for allowing a user to give various operation instructions to the image forming apparatus 1 (see FIG. 1). In the following description, it is assumed that a side at which the operation panel 205 is positioned in the image forming apparatus 1 is defined as a "front side" and an opposite side thereof is defined as a "rear side". Furthermore, it is assumed that a "left side" and a "right side" indicate a left side and a right side when the image forming apparatus 1 is viewed from the front side.

Figure 2:
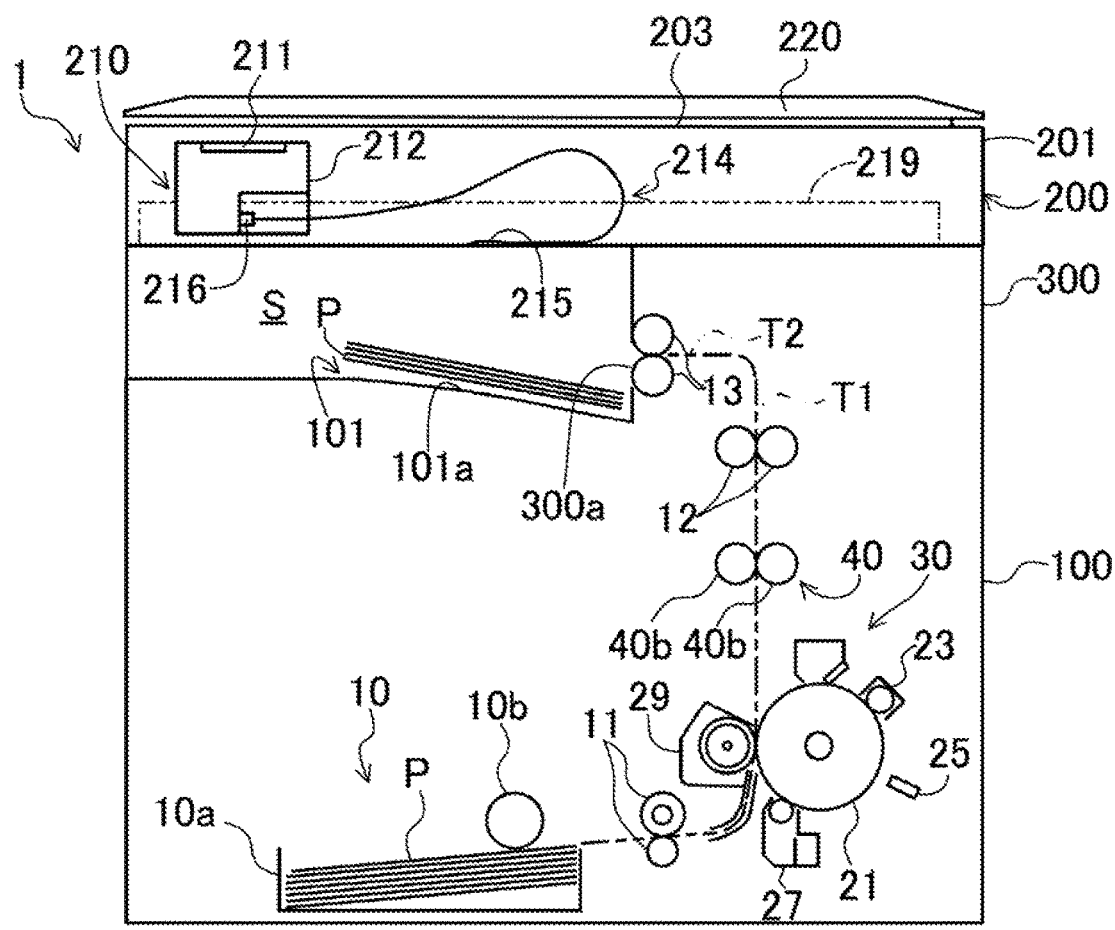
FIG. 2 is a schematic view illustrating an internal structure of an image forming apparatus including an image reading device in an embodiment.

As illustrated in FIG. 2, inside the image forming apparatus body 100, an image forming unit 30 is received. The image forming unit 30 is arranged in the vicinity of a right sidewall part in a lower part of the image forming apparatus body 100. Beside the image forming unit 30, a sheet feeding unit 10 is provided, and above the image forming unit 30, a fixing unit 40 is provided. The sheet feeding unit 10 has a sheet feeding cassette 10a for receiving a sheet-shaped sheet P, and a pick-up roller 10b for taking out the sheet P in the sheet feeding cassette 10a and sending the taken-out sheet P outside the cassette 10a. The sheet P sent outside the sheet feeding cassette 10a is supplied to the image forming unit 30 via a conveying roller pair 11.

The image forming unit 30 has a photosensitive drum 21, a charging device 23, an exposing device 25, a developing device 27, and a transfer device 29. At the time of image formation, a peripheral surface of the photosensitive drum 21 is first charged by the charging device 23, and then laser light based on document image data (image data of the document image read by the image reading device 200) is irradiated to the surface of the photosensitive drum 21 by the exposing device 25, so that an electrostatic latent image is formed. This electrostatic latent image is developed by the developing device 27 and becomes a toner image. This toner image is transferred to the sheet P by the transfer device 29 when the sheet P passes through between the transfer device 29 and the photosensitive drum 21.

The fixing unit 40 has a fixing roller 40a and a pressure roller 40b, and presses the sheet P supplied by the transfer device 29 between the fixing roller 40a and the pressure roller 40b, thereby thermally fixing the toner image to the sheet P. The sheet P with the toner image fixed by the fixing unit 40 is led to the sheet discharge space S by conveying roller pairs 12 and 13.

The aforementioned image reading device 200 has a rectangular box-shaped housing 201 that receives an image reading unit 210 therein. The aforementioned housing 201 is formed at an upper surface thereof with an approximately rectangular opening, wherein a document table glass 203 is fitted into the opening. At a rear end edge of the upper surface of the housing 201, a document cover 220 is supported via a hinge part (not illustrated) so as to be openable and closable. In a closed state, the document cover 220 presses a document placed on the document table glass 203 from an upper side, thereby fixing the document.

The aforementioned image reading unit 210 is arranged between the document table glass 203 mounted at the housing 201 and a bottom wall part of the housing 201. The image reading unit 210 moves while emitting light toward the document table glass 203 and optically reads an image of a document placed on the document table glass 203, thereby generating image data thereof and storing the image data in a memory.

Specifically, the image reading unit 210 has a contact image sensor (CIS) 211 and a carriage 212 that holds the contact image sensor 211.

The contact image sensor 211 is mounted at an upper surface part of the carriage 212. The contact image sensor 211 has a light source for irradiating light toward the document table glass 203, a plurality of elements for receiving reflected light from the light source, performing photo-electrical conversion on the reflected light, and outputting the converted electrical signals (image signals), and the like. The electrical signals outputted from each element of the contact image sensor 211 are transmitted to a fixed board via a flat cable 214 (see FIG. 3) to be described later.

The carriage 212 forms a shape obtained by notching a part of a rectangular parallelepiped extending in a main scanning direction. The carriage 212 is supported to be movable in a sub-scanning direction by a rail member 219 (illustrated only in FIG. 2 and is not illustrated in other drawings) extending in the sub-scanning direction. The carriage 212 is reciprocally driven between a predetermined initial position (so-called a home position and a position indicated by a solid line of FIG. 3) and a termination position (a position indicated by a two dot chain line of FIG. 3) by a driving mechanism (not illustrated). This initial position is positioned at one side end part (a left end part) of the rail member 219 in the sub-scanning direction and the termination position is positioned at the other side end part (a right end part) of the rail member 219 in the sub-scanning direction.

Figure 4:
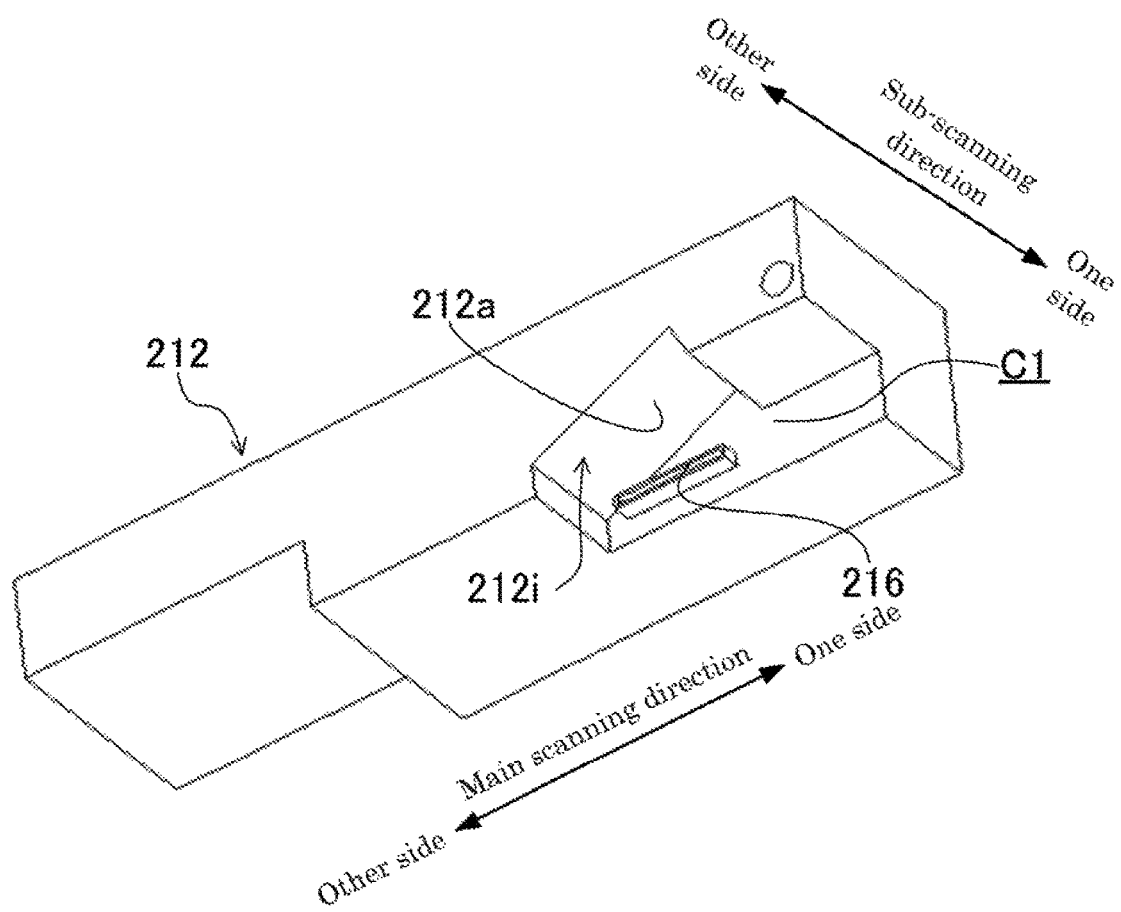
FIG. 4 is a perspective view illustrating an image reading unit.

As illustrated in FIG. 4, the carriage 212 is formed at the other side surface thereof in the sub-scanning direction with a rectangular parallelepiped-shaped notched part C1 opened to the other side in the sub-scanning direction and one side (the rear side of the image forming apparatus 1 in the present embodiment) in the main scanning direction. A connecting connector 216 protrudes from a wall surface directed to the other side in the sub-scanning direction among three sidewall surfaces forming the notched part C1. At a wall surface directed to a lower side among the three sidewall surfaces, a concave part 212i having a V shape when viewed from the sub-scanning direction is formed. One inclination surface (an angle restriction part) 212a constituting the concave part 212i is positioned above the connecting connector 216, and is upwardly inclined toward one side from the other side in the main scanning direction. This inclination angle is set to a range of about 25° to about 35° in the present embodiment. The inclination surface 212a is positioned above the connecting connector 216. Furthermore, the inclination surface 212a is formed to face an upper sidewall part 214a of the flat cable 214 to be described later.

The connecting connector 216 is formed in a rectangular parallelepiped shape extending in parallel to the main scanning direction. A connecting port of the connecting connector 216 is directed to the other side in the sub-scanning direction. The connecting connector 216 is electrically connected to the aforementioned contact image sensor 211 in the inside of the carriage 212.

To the aforementioned connecting connector 216, one end part (see FIG. 2 and FIG. 3) of the flat cable 214 is connected so as to be able to be inserted thereinto and removed therefrom. The other end part of the flat cable 214 is connected to a fixed board 215 fixed to the bottom wall part of the housing 201. The flat cable 214 is a belt-like cable having flexibility. The flat cable 214 includes a signal line for transmitting image data outputted from the contact image sensor 211, a power supply line for supplying power to the image reading unit 210, and the like.

The flat cable 214 is curved in an U shape when viewed from the main scanning direction. That is, the flat cable 214 has the upper sidewall part 214a and a lower sidewall part 214b, which face each other in an up and down direction, and a curved part 214c, which connected parts s of the both wall parts 214a and 214b (right side end parts) to each other, when viewed from the main scanning direction. The flat cable 214 is bent while increasing and decreasing a curvature radius R of the curved part 214c with the movement of the carriage 212 (the image reading unit 210).

Figure 3:
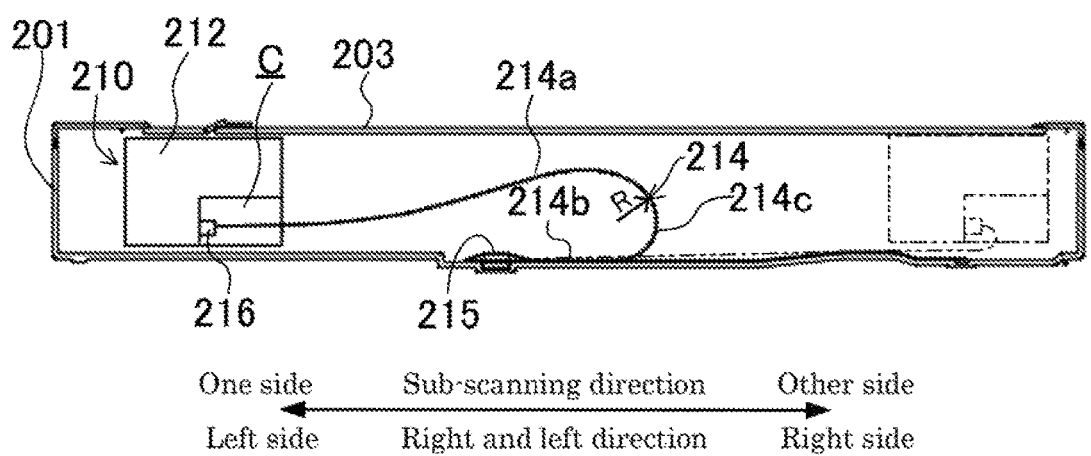
FIG. 3 is a schematic configuration view illustrating an image reading device.

In the reading operation of a document image by the image reading device 200, the carriage 212 is driven from the one side to the other side in the sub-scanning direction by the driving mechanism (not illustrated) starting from the predetermined initial position (the position indicated by the solid line of FIG. 3), and is stopped at the termination position (the position indicated by the two dot chain line of FIG. 3). By so doing, while the carriage 212 is moving from the initial position to the termination position, image data of the document at each scanning position is acquired by the contact image sensor 211. The image data of the document at each scanning position acquired by the contact image sensor 211 is transmitted to an image processing circuit on the fixed board 215 via the flat cable 214. In the image processing circuit, these pieces of image data are synthesized with each other to generate image data of the entire document, and the generated image data is stored in a memory. The carriage 212 is moved to the termination position by the driving mechanism and then is returned to the initial position.

As illustrated in FIG. 5, during the movement of the carriage 212, when the curvature radius R of the curved part 214c of the flat cable 214 becomes equal to or more than a predetermined value (for example, ½ of a distance between the lower surface of the document table glass 203 and the bottom wall part of the housing), the upper sidewall part 214a of the flat cable 214 contacts with the document table glass 203. As a consequence, frictional resistance occurs between the upper sidewall part 214a of the flat cable 214 and the document table glass 203, so that the movement speed of the carriage 212 (the image reading unit 210) may be changed due to the frictional resistance.

Figure 6:
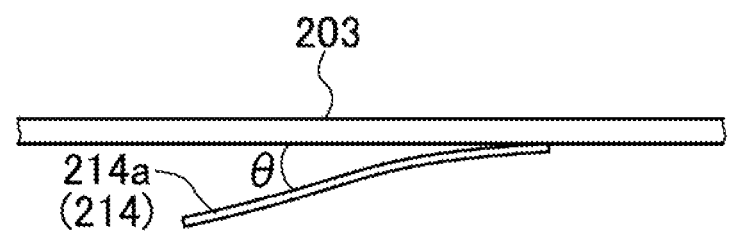
FIG. 6 is an explanation diagram for explaining operation and effect of an embodiment.

However, in the present embodiment, the upper sidewall part 214a of the flat cable 214 contacts with the inclination surface 212a formed at the upper side of the connecting connector 216 of the carriage 212. Since this inclination surface 212a is upwardly inclined toward one side from the other side in the main scanning direction, the inclination angle θ of the upper sidewall part 214a of the flat cable 214 with respect to the document table glass 203 is restricted to the same angle as that of the inclination surface 212a as illustrated in FIG. 6. As a consequence, a contact portion between the upper sidewall part 214a of the flat cable 214 and the document table glass 203 is biased to one side of the flat cable 214 in the main scanning direction. Consequently, as compared with the case where the inclination surface 212a is not provided, a contact area between the upper sidewall part 214a of the flat cable 214 and the document table glass 203 is reduced, so that it is possible to reduce the frictional resistance of the both. Thus, the speed variation of the carriage 212 due to frictional resistance or electrostatic attraction force is suppressed, so that it is possible to improve reading precision of a document image by the image reading unit 210.

Modification Example

Figure 7:
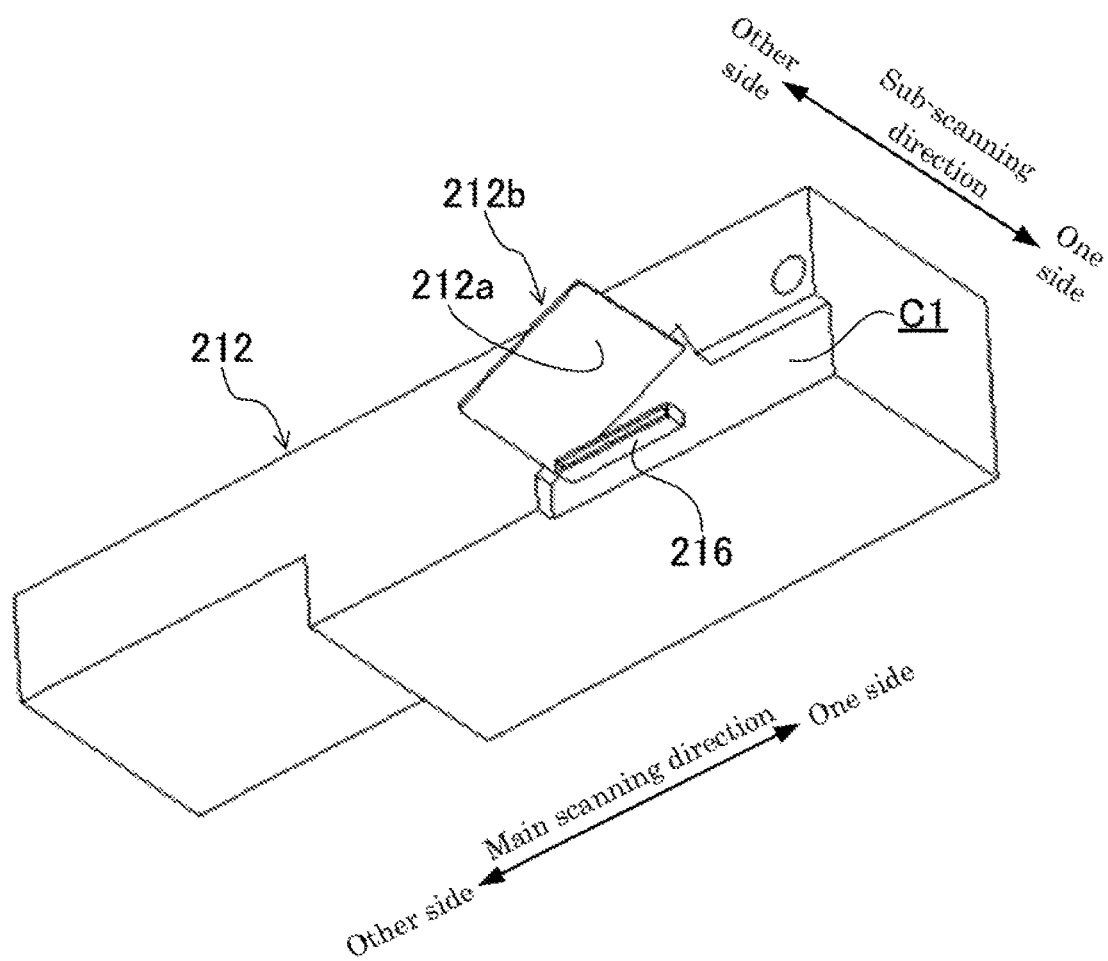
FIG. 7 is a view corresponding to FIG. 4, which illustrates a modification example.

FIG. 7 illustrates a modification example 1 of the aforementioned embodiment 1. In this modification example 1, a plate-like protruding wall part 212b is formed at the other side surface of the carriage 212 in the sub-scanning direction, so that the inclination surface 212a is formed. That is, the protruding wall part 212b is upwardly inclined from the one side toward the other side in the main scanning direction, so that the inclination surface 212a serves as a lower side surface of the protruding wall part 212b.

According to the modification example 1, it is possible to obtain operation and effect similar to those of the aforementioned embodiment 1.

Embodiment 2

Figure 8:
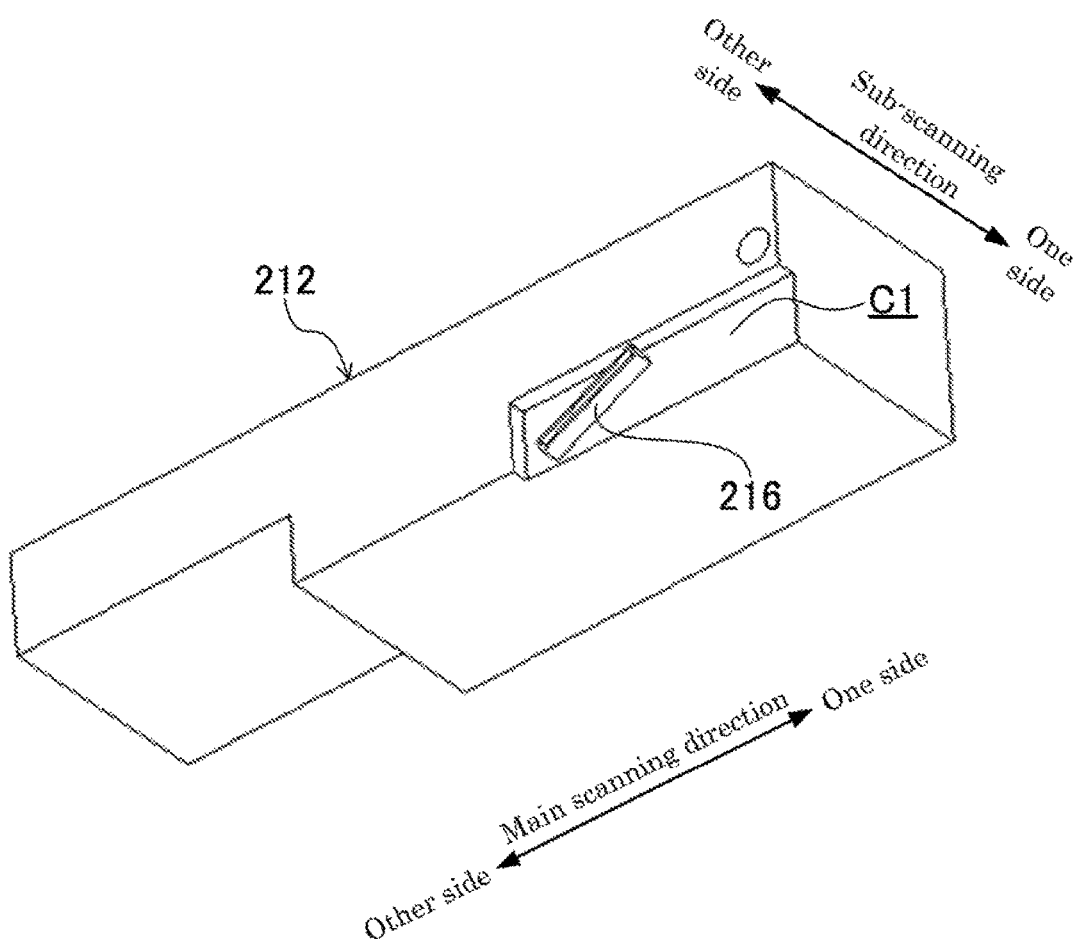
FIG. 8 is a view corresponding to FIG. 4, which illustrates an embodiment 2.

FIG. 8 illustrates an embodiment 2. This embodiment 2 is different from the aforementioned embodiment 1 and the modification example in that the angle restriction part for restricting the angle of the flat cable 214 is configured by the connecting connector 216 itself.

That is, in the present embodiment 2, the connecting connector 216 is upwardly inclined toward one side from the other side in the main scanning direction. According to this configuration, the upper sidewall part 214a of the flat cable 214 connected to the connecting connector 216 is upwardly inclined from the one side toward the other side in the main scanning direction. Consequently, when the curvature radius R of the curved part 214c of the flat cable 214 increases during the movement of the carriage 212 and the upper sidewall part 214a of the flat cable 214 contacts with the document table glass 203, contact portions of the both can be biased to one side of the flat cable 214 in the main scanning direction. Thus, it is possible to obtain operation and effect similar to those of the aforementioned embodiment 1. Furthermore, as compared with the embodiment 1, it is possible to simplify the shape of the carriage 212, so that it is possible to improve moldability of the carriage 212.

Embodiment 3

Figure 9:
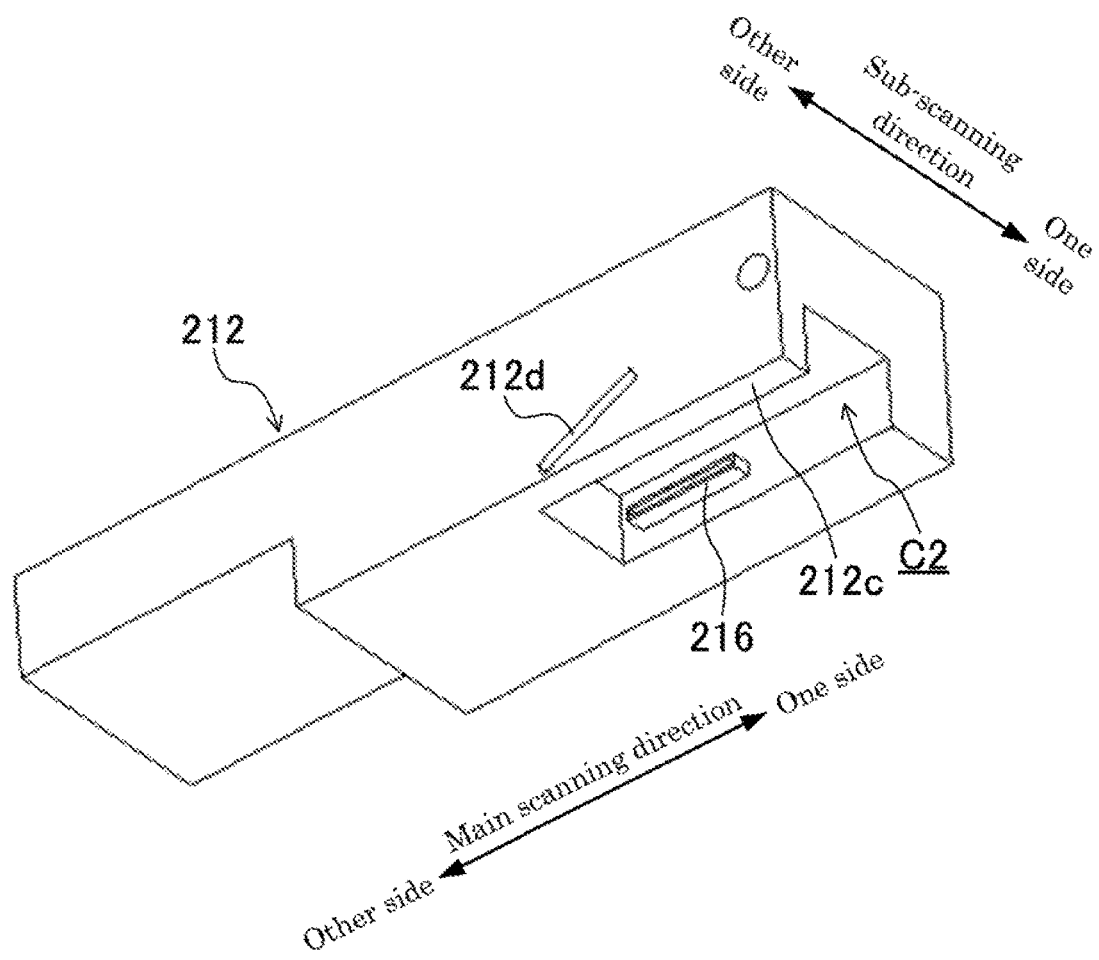
FIG. 9 is a view corresponding to FIG. 4, which illustrates an embodiment 3.

FIG. 9 illustrates an embodiment 3. This embodiment 3 is different from the aforementioned each embodiment and the modification example in that the angle restriction part for restricting the angle of the flat cable 214 is formed by an insertion hole 212d.

That is, in the present embodiment, the carriage 212 is formed at a lower end part thereof with a rectangular parallelepiped-shaped notched part C2 which is opened downward and to one side in the main scanning direction. A connecting connector 216 protrudes from a wall surface directed to the other side in the sub-scanning direction among four sidewall surfaces forming the notched part C2. At a vertical wall part 212c facing the connecting connector 216, a slit-like insertion hole 212d, into which the upper sidewall part 214a of the flat cable 214 is inserted, is formed. This insertion hole 212d is upwardly inclined toward one side from the other side in the main scanning direction. Consequently, the upper sidewall part 214a of the flat cable 214 connected to the connecting connector 216 is always inclined from the one side toward the other side in the main scanning direction. Consequently, when the curvature radius R of the curved part 214c of the flat cable 214 increases during the movement of the carriage 212 and the flat cable 214 contacts with the document table glass 203, contact portions of the both can be biased to one side of the flat cable 214 in the main scanning direction. Thus, it is possible to obtain operation and effect similar to those of the aforementioned embodiment 1.

Embodiment 4

Figure 10:
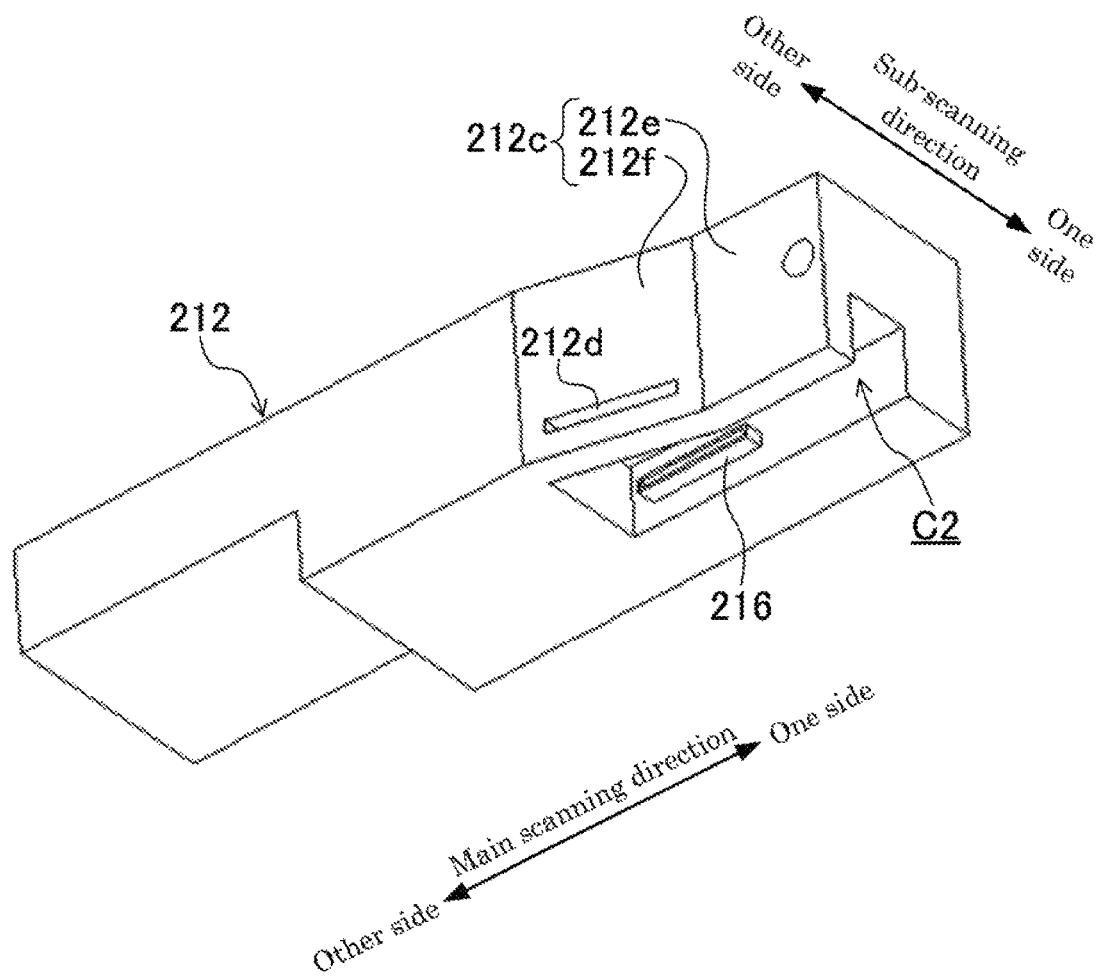
FIG. 10 is a view corresponding to FIG. 4, which illustrates an embodiment 4.

FIG. 10 illustrates an embodiment 4. This embodiment is different from the aforementioned each embodiment and the modification example in that the angle restriction part for restricting the angle of the flat cable 214 is formed by a vertical wall part 212c.

That is, the vertical wall part 212c of the present embodiment has a first wall part 212e extending in the main scanning direction and a second wall part 212f connected to the other side end part of the first wall part 212e in the main scanning direction. This second wall part 212f is provided at an insertion side of the flat cable 214 with respect to the connecting connector 216. The second wall part 212f is formed with a slit-like insertion hole 212d into which the upper sidewall part 214a of the flat cable 214 is inserted. A surface of the second wall part 212f, which is opposite to the connecting connector 216 side, is inclined to the connecting connector 216 side (one side in the sub-scanning direction) toward one side from the other side in the main scanning direction. As described above, the second wall part 212f is allowed to be inclined, so that one side portion of the upper sidewall part 214a of the flat cable 214 in the main scanning direction is easily turned up as compared with the other side portion. Consequently, the curvature radius R of the curved part 214c of the flat cable 214 increases and the upper sidewall part 214a of the flat cable 214 contacts with the document table glass 203, contact portions of the both can be biased to one side of the flat cable 214 in the main scanning direction. Thus, it is possible to obtain operation and effect similar to those of the aforementioned embodiment 1.

Embodiment 5

Figure 11:
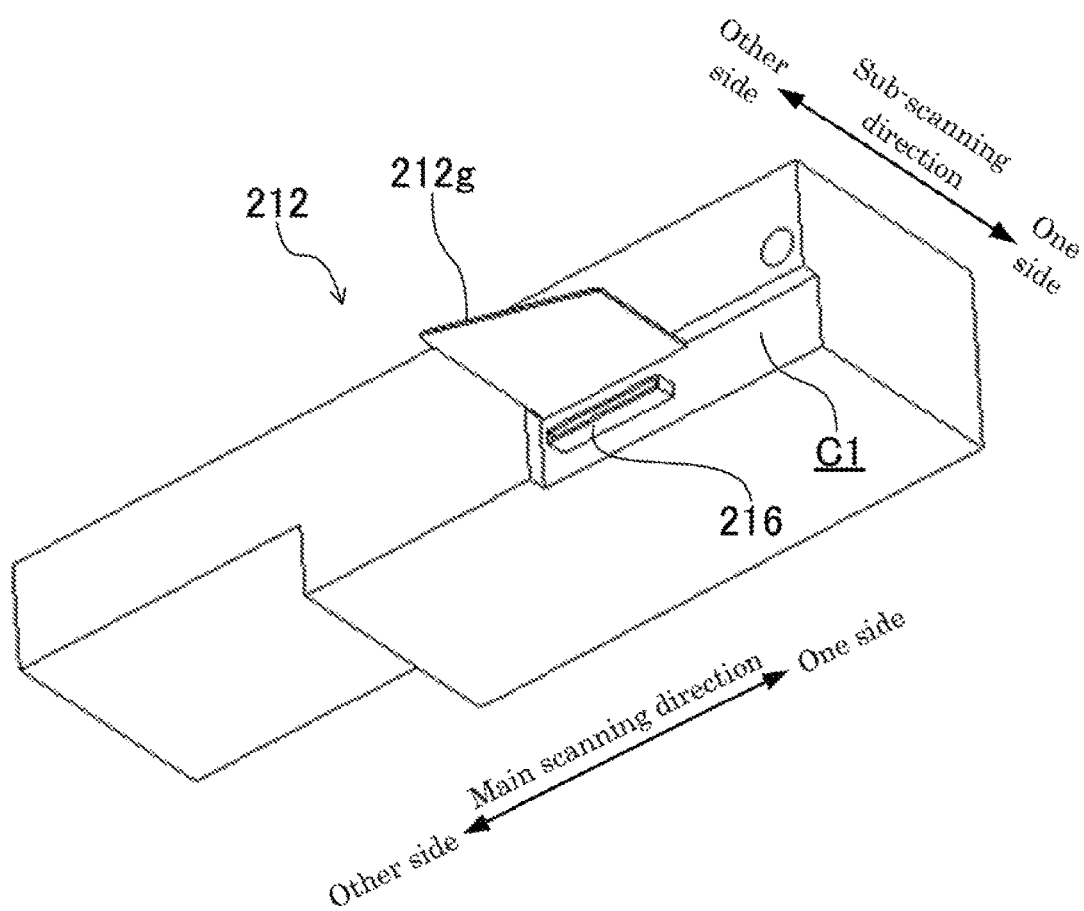
FIG. 11 is a view corresponding to FIG. 4, which illustrates an embodiment 5.

FIG. 11 illustrates an embodiment 5. This embodiment is different from the aforementioned each embodiment and the modification example in that the angle restriction part for restricting the angle of the flat cable 214 is formed by a protruding wall part 212g.

That is, in the present embodiment, the protruding wall part 212g is formed to protrude from a wall part provided with the connecting connector 216 and to face the upper sidewall part 214a (not illustrated in FIG. 11) of the flat cable 214. An end edge of the protruding side of the protruding wall part 212g is inclined to the aforementioned connecting connector 216 side toward one side from the other side in the main scanning direction. According to this configuration, one side portion of the upper wall part of the flat cable 214 in the main scanning direction is easily turned up as compared with the other side portion. Consequently, the curvature radius R of the curved part 214c of the flat cable 214 increases and the upper sidewall part 214a of the flat cable 214 contacts with the document table glass 203, contact portions of the both can be biased to one side of the flat cable 214 in the main scanning direction. Thus, it is possible to obtain operation and effect similar to those of the aforementioned embodiment 1.

Embodiment 6

Figure 12:
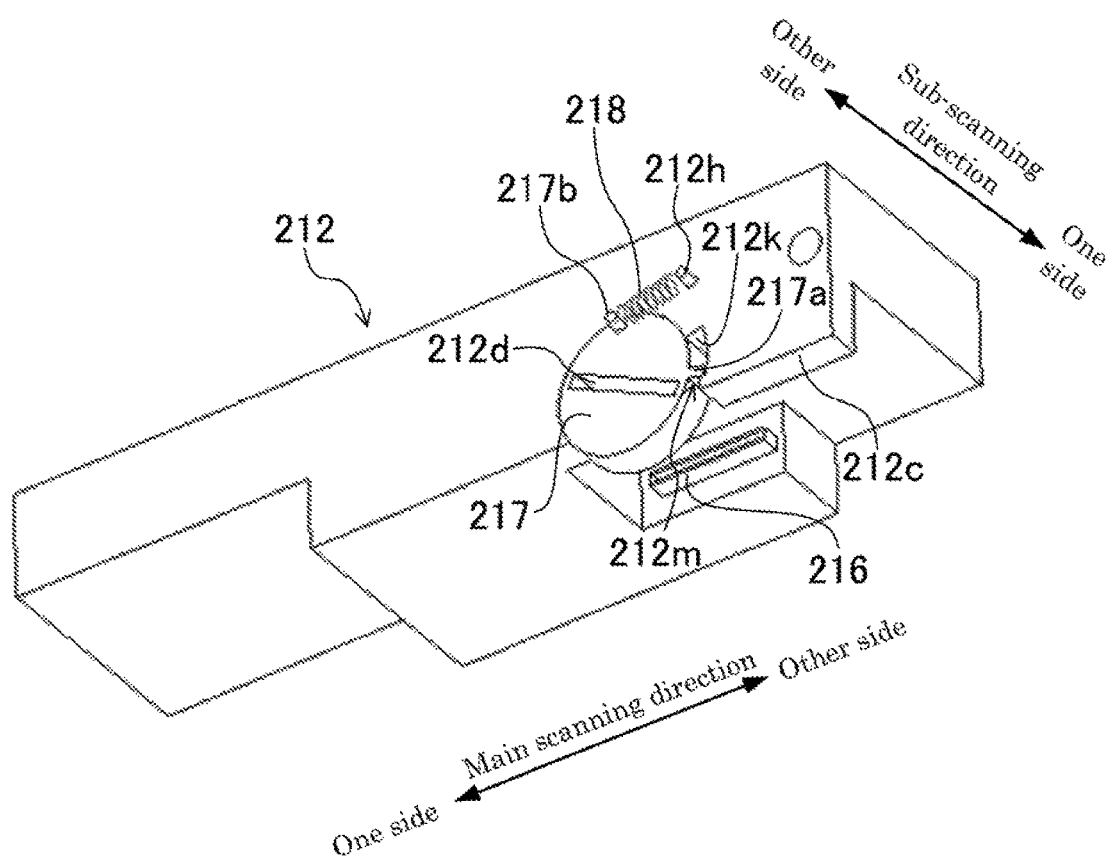
FIG. 12 is a view corresponding to FIG. 4, which illustrates an embodiment 6.
Figure 13:
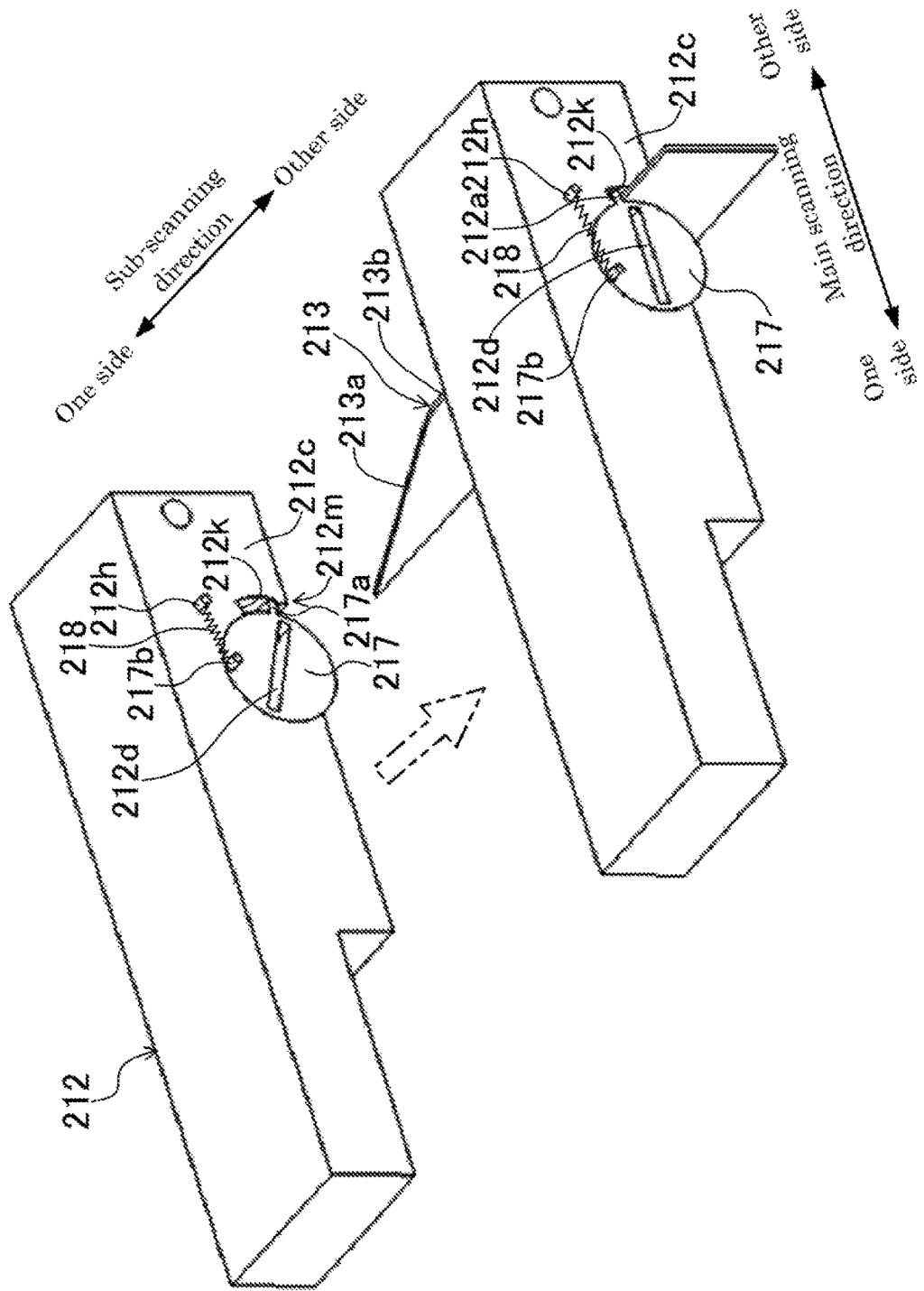
FIG. 13 is an explanation diagram for explaining an operation of an angle restriction part in an image reading device of an embodiment 6.

FIG. 12 and FIG. 13 illustrate an embodiment 6. This embodiment is different from the aforementioned each embodiment and the modification example in that the inclination angle of the flat cable 214 can be changed by an angle restriction part during reciprocal movement of the carriage 212. It is noted that in the aforementioned each embodiment and the modification example, one side in the main scanning direction is defined as the rear side of the image forming apparatus 1 and the other side in the main scanning direction is defined as the front side of the image forming apparatus 1; however, in the present embodiment, one side in the main scanning direction is defined as the front side of the image forming apparatus 1 and the other side in the main scanning direction is defined as the rear side of the image forming apparatus 1. The definition of the sub-scanning direction is similar to that of the aforementioned each embodiment and the modification example.

That is, in the present embodiment, the angle restriction part includes a rotating part 217 supported to the carriage 212, a protruding part 217a formed at the rotating part 217, and a restricting rail 213 (illustrated only in FIG. 13) abutting the protruding part 217a to restrict a rotation angle of the rotating part 217.

The rotating part 217 is formed in a disc shape in which a shaft line extends in the sub-scanning direction. The rotating part 217 is provided to the insertion side of the flat cable 214 with respect to the connecting connector 216. The rotating part 217 is supported to the carriage 212 so as to be rotatable around the shaft line. The rotating part 217 is formed with a slit-like insertion hole 212d into which the flat cable 214 is inserted. The insertion hole 212d passes through the rotating part 217 in a thickness direction (the sub-scanning direction) of the rotating part 217.

From a surface of the rotating part 217, which is opposite to the connecting connector 216 side, an engagement protruding part 217b, with which one end part of an urging spring 218 is engaged, protrudes. The urging spring 218 includes a tension coil spring in the present embodiment. The other end part of the urging spring 218 is engaged with an engagement protruding part 212h protruding from the vertical wall part 212c of the carriage 212. When the urging spring 218 is in a natural length state, the aforementioned insertion hole 212d is upwardly inclined toward one side from the other side in the main scanning direction.

The aforementioned protruding part 217a includes a plate-like part protruding radially outside from an outer peripheral surface of the rotating part 217. A thickness direction of this plate-like part coincides with a circumferential direction of the rotating part 217. The vertical wall part 212c is formed at a lower end part thereof with an arc-shaped guide concave part 212m through which the protruding part 217a passes with the rotation of the rotating part 217. An end surface 212k of one side in the circumferential direction of the guide concave part 212m abuts the protruding part 217a to restrict the rotation of the rotating part 217. In the state where the protruding part 217a abuts the end surface 212k, the insertion hole 212d is parallel (that is, horizontal) to the main scanning direction.

The restricting rail 213 includes a vertical plate extending in the sub-scanning direction. The restricting rail 213 is provided in the vicinity of the termination position of the carriage 212. That is, the restricting rail 213 is provided in an area (hereinafter, referred to as a termination vicinity area) where the curvature radius R of the curved part 214c of the flat cable 214 becomes equal to or less than a predetermined radius in the movement range of the carriage 212.

An upper end edge of the restricting rail 213 includes an inclination edge part 213a and a horizontal edge part 213b. The inclination edge part 213a is formed at an end part of one side in the sub-scanning direction. The inclination edge part 213a is upwardly inclined from the one side toward the other side in the main scanning direction. The other side end of the inclination edge part 213a in the sub-scanning direction is connected to the horizontal edge part 213b. The horizontal edge part 213b horizontally extends from the one side toward the other side in the sub-scanning direction.

Next, with reference to FIG. 13, an angle adjustment operation of the flat cable 214 by the aforementioned angle restriction part will be described.

As illustrated in the upper stage of FIG. 13, in the state in which the carriage 212 exists in the initial position, the carriage 212 is positioned at one side in the sub-scanning direction than the restricting rail 213, and the insertion hole 212d is upwardly inclined toward one side from the other side in the main scanning direction. Consequently, the upper sidewall part 214a of the flat cable 214 inserted into the insertion hole 212d becomes upwardly inclined toward one side from the other side in the main scanning direction.

When the carriage 212 moves toward the other side in the sub-scanning direction from the aforementioned initial position and reaches the aforementioned termination vicinity area, the inclination edge part 213a of the restricting rail 213 contacts with the protruding part 217a of the rotating part 217. When the carriage 212 further moves to the other side in the sub-scanning direction from this state, the protruding part 217a is upwardly pushed up by the inclination edge part 213a while sliding along the inclination edge part 213a. As a consequence, the rotating part 217 is rotated in the counterclockwise direction in the drawing against the urging force of the urging spring 218. Then, when the protruding part 217a reaches the horizontal edge part 213b, the insertion hole 212d is parallel (that is, horizontal) to the document table glass 203. Consequently, the upper sidewall part 214a of the flat cable 214 inserted into the insertion hole 212d is also parallel to the document table glass 203.

Thereafter, before the carriage 212 reaches the termination vicinity position, since the protruding part 217a horizontally moves while sliding along the horizontal edge part 213b, the upper sidewall part 214a of the flat cable 214 maintains the parallel relation to the document table glass 203.

Figure 14:
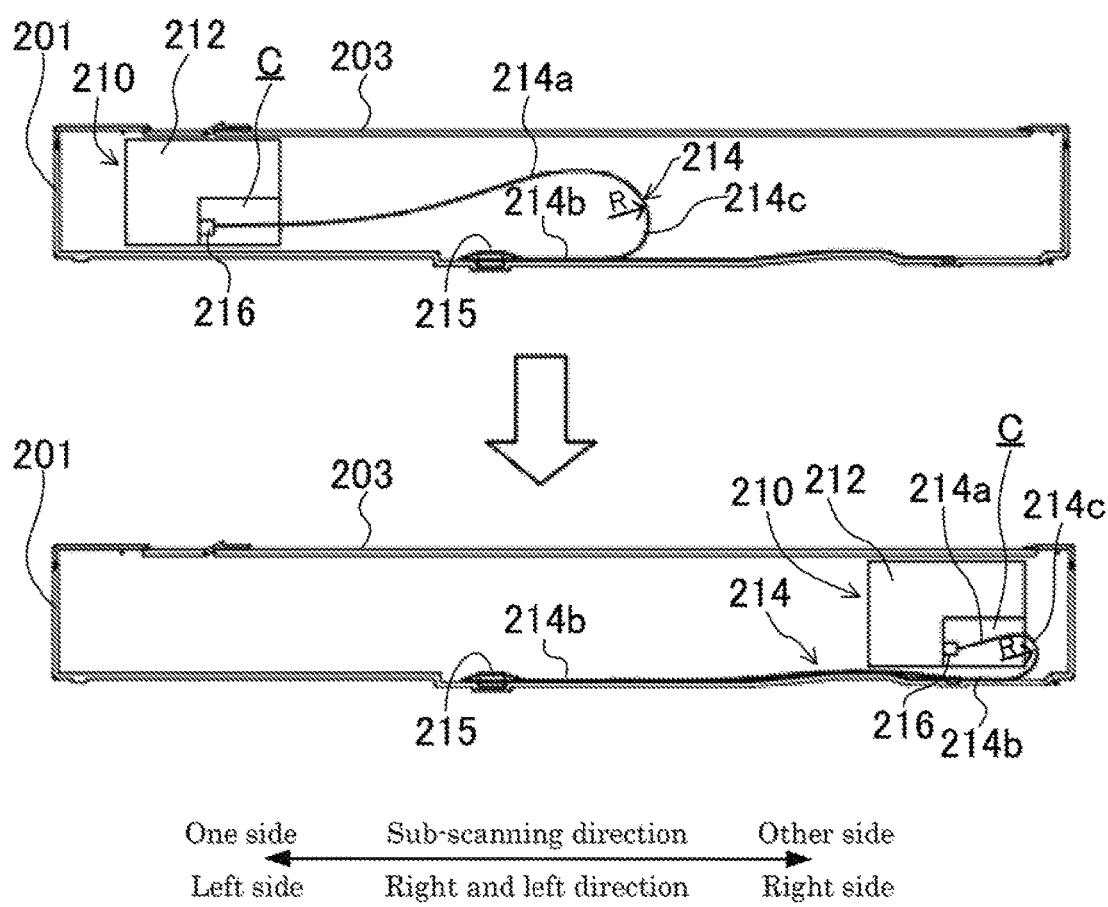
FIG. 14 is an explanation diagram for explaining an operation of an angle restriction part in an image reading device of an embodiment 6.

As described above, in the present embodiment, in the situation in which the carriage 212 moves in the aforementioned termination vicinity area, as the carriage 212 approaches the termination position, the inclination angle of the upper sidewall part 214a of the flat cable 214 with respect to the document table glass 203 becomes nearly parallel (horizontal). Consequently, it is possible to prevent an excessive twisting load from acting on the flat cable 214. That is, in the state where the carriage 212 exists in the termination vicinity area (the state of the lower stage of FIG. 14), since the curvature radius of the curved part 214c of the flat cable 214 is small (the curvature is large), excessive stress acts on the flat cable 214 when the flat cable 214 is twisted as compared with the case where the carriage 212 exists in the vicinity of the initial position. However, in the present embodiment, in the case where the carriage 212 exists in the termination vicinity area, the curvature radius R of the flat cable 214 decreases, so that the upper sidewall part 214a of the flat cable 214 becomes nearly parallel to the document table glass 203. Consequently, it is possible to obtain operation and effect similar to those of the aforementioned embodiment 1 while suppressing excessive twisting stress from acting on the flat cable 214.

OTHER EMBODIMENTS

In the aforementioned embodiments, the examples in which the contact image sensor 211 is installed at the carriage 212 have been described; however, the present invention is not limited thereto. That is, the configuration of the present invention can also be provided to an image reading device 200 in which an image sensor such as the contact image sensor 211 is not installed at the carriage 212. In this case, it is sufficient if a light source and a reflecting mirror are installed at the carriage 212 and an image sensor such as a CCD is fixed to the bottom wall part of the housing 201.

Furthermore, the present invention is not limited to the aforementioned embodiments 1 to 6 and the modification example, and includes configurations obtained by appropriately combining the embodiments 1 to 6 and the modification example with one another.

INDUSTRIAL APPLICABILITY

As described above, the present invention is useful for an image reading device.

The invention claimed is:
1. An image reading device comprising:
  a housing mounted at an upper surface thereof with a document table glass;
  an image reading unit that emits light toward the document table glass while reciprocally moving in a sub-scanning direction perpendicular to a main scanning direction between a bottom wall part of the housing and the document table glass; and
  a flat cable having one end part connected to the image reading unit, the other end part fixed to the bottom wall part of the housing and arranged in an U shape consisting of an upper sidewall part, a lower sidewall part and a curved part for connecting the both sidewall parts when viewed from the main scanning direction, wherein the image reading device further comprises:
an angle restriction part that restricts an inclination angle of the flat cable with respect to the document table glass when viewed from the sub-scanning direction of the flat cable such that when a contact portion between an upper surface part of the flat cable and the document table glass is generated with movement of the image reading unit, the contact portion is biased to one side of the flat cable in the main scanning direction.

2. The image reading device of claim 1, wherein the angle restriction part includes an inclination surface formed in the image reading unit and facing an upper surface of the upper sidewall part of the flat cable, and
the inclination surface is upwardly inclined toward the one side from the other side in the main scanning direction.

3. The image reading device of claim 1, wherein the angle restriction part includes a slit-like insertion hole formed in the image reading unit and into which the upper sidewall part of the flat cable is inserted, and
the insertion hole is upwardly inclined toward the one side from the other side in the main scanning direction.

4. The image reading device of claim 1, wherein the angle restriction part includes a wall part fixed to the image reading unit and facing the upper surface of the upper sidewall part of the flat cable, and
the wall part is upwardly inclined toward the one side from the other side in the main scanning direction.

5. The image reading device of claim 1, wherein the image reading unit is provided with a connecting connector to which the one end part of the flat cable is connected,
the connecting connector is upwardly inclined from the one side toward the other side in the main scanning direction, and
the angle restriction part is configured by the connecting connector.

6. The image reading device of claim 1, wherein the image reading unit has a connecting connector to which the one end part of the flat cable is connected,
the image reading unit has a vertical wall part provided at a side of the flat cable than the connecting connector and having slit-like insertion hole into which the upper sidewall part of the flat cable is inserted,
a surface of the vertical wall part, which is opposite to a side of the connecting connector, is inclined to the side of the connecting connector toward the one side from the other side in the main scanning direction, and
the angle restriction part is configured by the surface of the opposite side.

7. The image reading device of claim 1, wherein the image reading unit has a connecting connector to which the one end part of the flat cable is connected and a protruding wall part protruding from a wall part provided with the connecting connector and facing the upper surface of the flat cable,
an end edge of a protruding side of the protruding wall part is inclined to a side of the connecting connector toward the one side from the other side in the main scanning direction, and
the angle restriction part is configured by the protruding wall part.

8. The image reading device of claim 1, wherein the angle restriction part is configured to reduce the inclination angle of the flat cable as a curvature radius of the curved part of the flat cable is reduced during the reciprocal movement of the image reading unit.

9. The image reading device of claim 8, wherein the angle restriction part comprises:
a rotating part having an insertion hole into which the flat cable is inserted, extending in the sub-scanning direction with respect to the image reading unit, and held around a shaft line so as to be rotatable;
a protruding part protruding radially outside from an outer peripheral surface of the rotating part;
a restricting rail fixed to the bottom wall part of the housing and extending in the sub-scanning direction; and
an inclination edge part formed in the restricting rail and upwardly inclined from the one side toward the other side in the sub-scanning direction,
wherein when a position of the image reading unit exists in an area where the curvature radius of the curved part of the flat cable becomes equal to or less than a predetermined radius, as the curvature radius of the curved part is reduced with movement of the image reading unit, the protruding part is upwardly pushed up by the inclination edge part and the rotating part is rotated in a direction in which the inclination angle of the flat cable is reduced.

* * * * *